(12) United States Patent
Yokota et al.

(10) Patent No.: US 7,628,715 B2
(45) Date of Patent: Dec. 8, 2009

(54) GOLF BALL

(75) Inventors: Masatoshi Yokota, Kobe (JP); Seiichiro Endo, Kobe (JP); Masaaki Kikuchi, Kobe (JP); Koichi Fujisawa, Kobe (JP); Kazuhiko Isogawa, Kobe (JP)

(73) Assignee: SRI Sports Ltd., Kobe (JP)

( * ) Notice: Subject to any disclaimer, the term of this patent is extended or adjusted under 35 U.S.C. 154(b) by 0 days.

(21) Appl. No.: 11/165,131

(22) Filed: Jun. 24, 2005

(65) Prior Publication Data
US 2006/0003853 A1 Jan. 5, 2006

(30) Foreign Application Priority Data
Jul. 5, 2004 (JP) ............................. 2004-198085

(51) Int. Cl.
*A63B 37/12* (2006.01)
(52) U.S. Cl. ..................................... 473/383
(58) Field of Classification Search ................ 473/378, 473/383, 384
See application file for complete search history.

(56) References Cited

U.S. PATENT DOCUMENTS

| | | | |
|---|---|---|---|
| 5,816,943 A * | 10/1998 | Masutani et al. ............. | 473/365 |
| 5,823,890 A | 10/1998 | Maruko et al. | |
| 5,836,833 A | 11/1998 | Shimosaka et al. | |
| 6,299,550 B1 | 10/2001 | Molitor et al. | |
| 6,773,364 B2 * | 8/2004 | Sullivan et al. ............. | 473/370 |
| 6,835,793 B2 | 12/2004 | Yokota et al. | |
| 2003/0120020 A1 | 6/2003 | Yokota et al. | |
| 2003/0158000 A1 * | 8/2003 | Kennedy et al. ............ | 473/371 |
| 2003/0232934 A1 | 12/2003 | Yokota | |

FOREIGN PATENT DOCUMENTS

| | | |
|---|---|---|
| JP | 3000918 B2 | 11/1999 |
| JP | 2003-154034 A | 5/2003 |

* cited by examiner

*Primary Examiner*—Raeann Trimiew
(74) *Attorney, Agent, or Firm*—Birch, Stewart, Kolasch & Birch, LLP (57) ABSTRACT

The present invention provides a golf ball having excellent rebound characteristics and excellent flight performance, while maintaining good durability and good appearance. The present invention relates to a golf ball comprising a core composed of a center and at least one intermediate layer formed on the center, and a cover covering the core, and having many dimples on the surface thereof, wherein the outermost layer of the intermediate layer is formed from thermoplastic resin, has a thickness of 0.5 to 3.0 mm, and has depressions on the surface thereof at the position and shape corresponding to the dimples through the cover, and the cover is formed from thermoplastic resin and has a thickness of 0.1 to 0.8 mm in land portion having no dimple.

10 Claims, 2 Drawing Sheets

GOLF BALL

FIELD OF THE INVENTION

The present invention relates to a golf ball. More particularly, it relates to a golf ball having excellent rebound characteristics and excellent flight performance, while maintaining good durability and good appearance.

BACKGROUND OF THE INVENTION

Recently, golf balls have been multi-layered in order to impart multi functions and high performances to themselves, and the cover has been multi-layered. However, since resins for the cover material typically have poor rebound characteristics compared with core material of rubber, it is required to reduce the cover thickness as possible compared with the conventional golf balls.

As a method of covering on the core with the cover, there have been a press molding method comprising molding the cover resin into a semi-spherical half-shell in advance, covering the core with the two half-shells, followed by pressure molding under heating; and a injection method comprising holding the core in the mold and injection molding the cover composition directly on the core.

In case of molding the cover having small thickness, particularly not more than 1 mm, it is difficult to mold the cover by the injection molding method, because the gap for injecting cover resin is too small. Therefore, the press molding method is mainly used (Japanese Patent No. 3000918).

In Japanese Patent No. 3000918, a golf ball comprising a core and a cover of two layer structure consisting of inner and outer layers, wherein a color difference ΔE in Lab color space between the inner and outer layers is up to 3 as measured by a calorimeter is disclosed.

Golf ball typically has many dimples on the surface thereof, and the dimple generally has a depth of 0.1 to 0.2 mm. In case of the cover having very small thickness as described above, the cover thickness is small particularly at the bottom of the dimple, and the core, which is the under layer of the cover, may be exposed. Even if the cover is formed, the core shows through the cover at the portion that the cover is too thin, and it is problem that the appearance is degraded. In addition, peeling and crack of the cover occurs, and it is problem that the durability is degraded.

In order to solve the problems, a golf ball that the surface of the core has dimples having the same shape as the dimples of the cover at locations corresponding to the locations of the dimples of the cover has been suggested (Japanese Patent Kokai Publication No. 154034/2003).

In Japanese Patent Kokai Publication No. 154034/2003, a golf ball having many dimples on the surface of the cover, which the surface of the core has dimples having the same shape as the dimples of the cover at locations corresponding to the locations of the dimples of the cover is disclosed. However, at the time of molding the cover, it is difficult to fit projections corresponding to the shape of the dimples in a cover mold, in the dimples on the surface of the core. Therefore, it has been problem to complicate the manufacturing process and take much time.

OBJECTS OF THE INVENTION

A main object of the present invention is to provide a golf ball having excellent rebound characteristics and excellent flight performance, while maintaining good durability and good appearance.

According to the present invention, the object described above has been accomplished by providing a golf ball comprising a core composed of a center and at least one intermediate layer formed on the center, and a cover covering the core, and having many dimples on the surface thereof; using thermoplastic resin for the outermost layer of the intermediate layer and the cover; adjust the thickness of the outermost layer of the intermediate layer and the thickness in land portion having no dimples of the cover to specified ranges; and forming depressions on the surface of the outermost layer of the intermediate layer at the position and shape corresponding to the dimples, thereby providing a golf ball having excellent rebound characteristics and excellent flight performance, while maintaining good durability and good appearance.

SUMMARY OF THE INVENTION

The present invention relates to a golf ball comprising a core composed of a center and at least one intermediate layer formed on the center, and a cover covering the core, and having many dimples on the surface thereof, wherein
   the outermost layer of the intermediate layer is formed from thermoplastic resin, has a thickness of 0.5 to 3.0 mm, and has depressions on the surface thereof at the position and shape corresponding to the dimples through the cover, and
   the cover is formed from thermoplastic resin and has a thickness of 0.1 to 0.8 mm in land portion having no dimple.

In order to put the present invention into a more suitable practical application,
   it is desired that the depression on the surface of the outermost layer of the intermediate layer have a depth of 5 to 95%, based on the depth of the dimple; and
   it is desired that the cover have a thickness of 0.2 to 0.6 mm in land portion having no dimple, and the outermost layer of the intermediate layer have a thickness of 0.5 to 2.0 mm.

In another embodiment, the present invention relates to a method of making a golf ball comprising a core composed of a center and at least one intermediate layer formed on the center, and a cover covering the core, and having many dimples on the surface thereof, the method comprising the steps of:
   (a) forming a spherical center,
   (b) covering the intermediate layer on the center by using two core half molds having a semi-spherical cavity to form a spherical core,
   (c) (i) molding the cover composition into a semi-spherical half-shell for the cover,
       (ii) covering the core with the two half-shell and placing it in a golf ball half mold having a semi-spherical cavity and many projections corresponding to the shape of the dimples in the cavity,
       (iii) covering the core with the cover by press molding under heating to mold a golf ball and simultaneously form a depression on the surface of the intermediate layer at the position corresponding to the dimple through the cover, and
   (d) after cooling, opening the mold to take out a molded golf ball.

In the method of making the golf ball of the present invention, in the step (c-iii), the cover is covered on the core to form the golf ball and simultaneously the depression is formed on the surface of the intermediate layer at the position corresponding to the dimple through the cover. Therefore, according to the present invention, it is possible to solve the problem to complicate the manufacturing process and take much time because at the time of molding the cover, it is difficult to fit projections corresponding to the position of the dimples in a cover mold in the dimples on the surface of the core, as described above in Japanese Patent Kokai Publication No. 154034/2003.

In further another embodiment, the present invention relates to a golf ball prepared by a method of making a golf ball comprising a core composed of a center and at least one intermediate layer formed on the center, and a cover covering the core, and having many dimples on the surface thereof, the method comprising the steps of:

(a) forming a spherical center, (b) covering the intermediate layer on the center by using two core half molds having a semi-spherical cavity to form a spherical core, (c) (i) molding the cover composition into a semi-spherical half-shell for the cover, (ii) covering the core with the two half-shell and placing it in a golf ball half mold having a semi-spherical cavity and many projections corresponding to the shape of the dimples in the cavity, (iii) covering the core with the cover by press molding under heating to mold a golf ball and simultaneously form a depression on the surface of the intermediate layer at the position corresponding to the dimple through the cover, and (d) after cooling, opening the mold to take out a molded golf ball, wherein the outermost layer of the intermediate layer is formed from thermoplastic resin, has a thickness of 0.5 to 3.0 mm, and has depressions on the surface thereof at the position and shape corresponding to the dimples through the cover, and the cover is formed from thermoplastic resin and has a thickness of 0.1 to 0.8 mm in land portion having no dimple.

In order to put the present invention into a more suitable practical application, it is desired that the depression on the surface of the outermost layer of the intermediate layer have a depth of 5 to 95%, based on the depth of the dimple; and it is desired that the cover have a thickness of 0.2 to 0.6 mm in land portion having no dimple, and the outermost layer of the intermediate layer have a thickness of 0.5 to 2.0 mm.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accomplishing drawings which are given by way of illustrating only, and thus are not limitative of the present invention, and wherein.

DETAILED DESCRIPTION OF THE PREFERRED EMBODIMENTS

Figure 1:
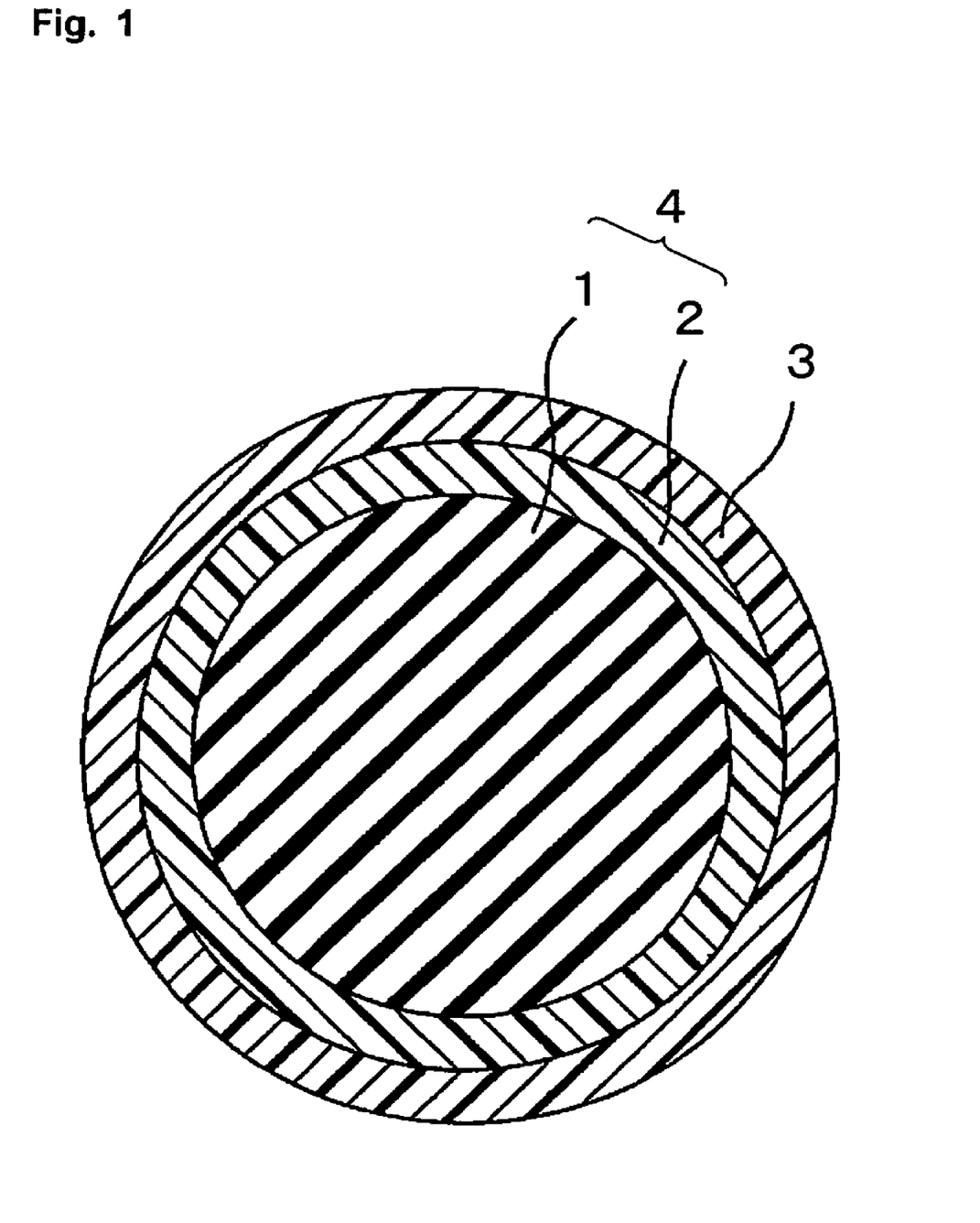
FIG. 1 is a schematic cross section illustrating one embodiment of the golf ball of the present invention.

The golf ball of the present invention will be explained with reference to the accompanying drawing in detail hereinafter. FIG. 1 is a schematic cross section illustrating one embodiment of the golf ball of the present invention. As shown in FIG. 1, the golf ball of the present invention comprises a core 4 composed of a center 1 and at least one intermediate layer 2 formed on the center, and a cover 3 covering the core. In FIG. 1, in order to explain the golf ball of the present invention simply, a golf ball having one layer of intermediate layer 2, that is, a three-piece solid golf ball will be used hereinafter for explanation.

The center 1 may be the same one that has been conventionally used for solid golf ball, and may be obtained by mixing a rubber composition using a proper mixer, such as a mixing roll, and then vulcanizing and press-molding under applied heat the rubber composition in a mold into a spherical form. The rubber composition comprises 10 to 60 parts by weight of a vulcanizing agent (crosslinking agent), for example, $\alpha,\beta$-unsaturated carboxylic acid having 3 to 8 carbon atoms (such as acrylic acid, methacrylic acid, etc.) or mono or divalent metal salts, such as zinc or magnesium salts thereof, or a functional monomer such as trimethylolpropane trimethacrylate, or a combination thereof;

0.5 to 5 parts by weight of co-crosslinking initiator such as organic peroxides;

10 to 30 parts by weight of filler such as zinc oxide, barium sulfate and the like; and optionally organic sulfide compound, antioxidant and the like, based on 100 parts by weight of a base rubber such as cis-1,4-polybutadiene rubber. The vulcanization may be conducted, for example, by press molding in a mold at 130 to 240° C. and 2.9 to 11.8 MPa for 15 to 60 minutes. It is preferable for the surface of the resulting center to be buffed to improve the adhesion to the intermediate layer formed on the center. However, such center is given by way of illustrative examples only, and the invention shall not be limited thereto. The center may have single-layered structure or multi-layered structure, which has two or more layers.

In the golf ball of the present invention, it is desired that the center 1 have a diameter of 35.2 to 41.6 mm, preferably 37.6 to 41.3 mm, more preferably 38.0 to 40.8 mm. When the diameter of the center is smaller than 35.2 mm, the cover is thick, and the rebound characteristics of the resulting golf ball are degraded. On the other hand, when the diameter is larger than 41.6 mm, the thickness of the cover is too thin, and the durability of the resulting golf ball is degraded.

The intermediate layer 2 is then formed on the center 1 to form the core 4. Examples of materials used for the intermediate layer 2 in the golf ball of the present invention include thermoplastic resins, such as ionomer resin, ethylene-vinyl acetate copolymer (EVA) resin, polyethylene resin, polypropylene resin; thermoplastic elastomers, such as polyester-based thermoplastic elastomer, polyamide-based thermoplastic elastomer, polyurethane-based thermoplastic elastomer; or mixtures thereof and the like. Preferred is ionomer resin because it has high rebound characteristics.

The ionomer resin may be a copolymer of $\alpha$-olefin and $\alpha,\beta$-unsaturated carboxylic acid having 3 to 8 carbon atoms, of which a portion of carboxylic acid groups is neutralized with metal ion, a terpolymer of α-olefin, α,β-unsaturated carboxylic acid having 3 to 8 carbon atoms and α,β-unsaturated carboxylic acid ester, of which a portion of carboxylic acid groups is neutralized with metal ion or mixture thereof. Examples of the α-olefins in the ionomer preferably include ethylene, propylene and the like. Examples of the α,β-unsaturated carboxylic acid in the ionomer include acrylic acid, methacrylic acid, fumaric acid, maleic acid, crotonic acid and the like, preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion, which neutralizes a portion of carboxylic acid groups of the copolymer or terpolymer, includes an alkali metal ion, such as a sodium ion, a potassium ion, a lithium ion and the like; a divalent metal ion, such as a zinc ion, a calcium ion, a magnesium ion and the like; a trivalent metal ion, such as an aluminum, a neodymium ion and the like; and mixture thereof. Preferred are sodium ions, zinc ions, lithium ions and the like, in view of rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856, Hi-milan AM7316, Hi-milan AM7329 and the like. Examples of the ionomer resins, which are commercially available from Du Pont Co., include Surlyn 8945, Surlyn 9945, Surlyn 6320, Surlyn 8320, Surlyn AD8511, Surlyn AD8512, Surlyn AD8542 and the like. Examples of the ionomer resins, which are commercially available from Exxon Chemical Co., include Iotek 7010, Iotek 8000 and the like. These ionomer resins may be used alone or in combination with two or more.

In the golf ball of the present invention, it is required for the intermediate layer 2 to have a thickness of 0.5 to 3.0 mm, preferably 0.5 to 2.0 mm, more preferably 0.8 to 2.0 mm. When the thickness of the intermediate layer 2 is smaller than 0.5 mm, the durability of the resulting golf ball effects accomplished by the presence of the intermediate layer are degraded. On the other hand, when the thickness is larger than 3.0 mm, the rebound characteristics of the resulting golf ball are degraded.

The intermediate layer 2 may have single-layered structure or multi-layered structure, which has two or more layers. If the intermediate layer 2 has multi-layered structure, it is not limited as long as the outermost layer, that is, the outermost layer of the core 4 is formed from thermoplastic resin and has the above thickness.

The intermediate layer 2 of the present invention may be formed by conventional methods, which have been known in the art and used for forming the cover of the golf balls. For example, there can be used a method comprising molding the intermediate layer composition into a semi-spherical half-shell in advance, covering the center 1 with the two half-shells, followed by press molding at 130 to 170° C. for 1 to 5 minutes, or a method comprising injection molding the intermediate layer composition directly on the center, which is covered with the intermediate layer, to cover it. Preferred is injection molding method in view of moldability. The resulting spherical core 4 obtained by forming the intermediate layer 2 on the center 1 has substantially smooth surface at the time of obtaining the core.

The cover 3 is then covered on the core 4. In the golf ball of the present invention, materials used for the cover, which are not limited, may be the same one that has been conventionally used for the cover of solid golf ball. Preferred is polyurethane material in view of good durability, and particularly preferred is polyurethane-based thermoplastic elastomer in view of processability and cost.

Polyurethane-based thermoplastic elastomer generally contains polyurethane structure as hard segment and polyester or polyether as soft segment. The polyurethane structure generally contains diisocyanate and curing agent, such as amine-based curing agent. The polyurethane-based thermoplastic elastomer includes polyurethane-based thermoplastic elastomer that the diisocyanate is aromatic diisocyanate, cycloaliphatic diisocyanate or aliphatic diisocyanate.

Examples of the aromatic diisocyanate include tolylene diisocyanate (TDI), 4,4'-diphenylmethane diisocyanate (MDI), 1,5-naphthylene diisocyanate (NDI), tolidine diisocyanate (TODI), xylylene diisocyanate (XDI) and the like. Preferred is MDI. Concrete examples of the polyurethane-based thermoplastic elastomer formed by using the MDI include polyurethane-based thermoplastic elastomer, which is commercially available from BASF Japan Co., Ltd. under the trade name of "Elastollan ET890", and the like.

Examples of the cycloaliphatic diisocyanates include 4,4'-dicyclohexylmethane diisocyanate ($H_{12}$MDI), which is hydrogenated compound of MDI; 1,3-bis(isocyanatomethyl) cyclohexane ($H_6$XDI), which is hydrogenated compound of XDI; isophorone diisocyanate (IPDI); and trans-1,4-cyclohexane diisocyanate (CHDI). Preferred is the $H_{12}$MDI in view of general-purpose properties and processability. Concrete examples of the polyurethane-based thermoplastic elastomer formed by using the $H_{12}$MDI include polyurethane-based thermoplastic elastomers, which are commercially available from BASF Japan Co., Ltd. under the trade name of "Elastollan XNY90A", "Elastollan XNY97A", "Elastollan XNY585", "Elastollan XKP-016N", and the like.

Examples of the aliphatic diisocyanates include 1,6-hexamethylene diisocyanate (HMDI), lysine diisocyanate (LDI) and the like. Concrete examples of the polyurethane-based thermoplastic elastomer formed by using the HMDI include polyurethane-based thermoplastic elastomer, which is commercially available from Dainippon Ink & Chemicals Inc. under the trade name of "Pandex T-7890" (trade name), and the like.

Preferred are polyurethane-based thermoplastic elastomers formed by using diisocyanate having no double bond in backbone structure in molecule, that is, aliphatic diisocyanate and cycloaliphatic diisocyanate in view of yellowing resistance. Preferred are polyurethane-based thermoplastic elastomers formed by using cycloaliphatic diisocyanate and aromatic diisocyanate, which have high mechanical strength, in view of durability, such as scuff resistance. Therefore, in the present invention, preferred is polyurethane-based thermoplastic elastomer formed by using cycloaliphatic diisocyanate in view of both the yellowing resistance and durability.

For the cover 3 of the golf ball of the present invention, the above polyurethane-based thermoplastic elastomer may be used alone, or the polyurethane-based thermoplastic elastomer may be used in combination with at least one of the ionomer resin as used for the intermediate layer 2 and the other thermoplastic material that has been conventionally used for the golf ball cover.

In the golf ball of the present invention, the cover composition may optionally contain fillers such as barium sulfate, pigments such as titanium dioxide, and other additives (such as a dispersant, an antioxidant, a UV absorber, a photostabilizer and a fluorescent agent or a fluorescent brightener, etc.), in addition to the base resin as a main component, as long as the addition of the additive does not deteriorate the desired performance of the golf ball cover. If used, the amount of the pigment is preferably 0.1 to 5.0 parts by weight, based on the 100 parts by weight of the base resin of the cover.

In the golf ball of the present invention, it is required for the cover 3 to have a thickness of 0.1 to 0.8 mm in land portion having no dimple, preferably 0.2 to 0.8 mm, more preferably 0.3 to 0.7 mm. When the thickness of the cover is smaller than 0.1 mm, the durability of the resulting golf ball is degraded. On the other hand, when the thickness is larger than 0.8 mm, the rebound characteristics of the resulting golf ball are degraded, which reduces the flight distance.

In the golf ball of the present invention, when the difference between the cover thickness in land portion having no dimple and the cover thickness at dimple bottom portion is small, it is represented that cover thickness in the whole golf ball is uniform. It is desired for the cover to have the thickness difference of 0 to 0.2 mm, preferably 0 to 0.15 mm, more preferably 0 to 0.12 mm.

In the golf ball of the present invention, it is desired for the cover to have a hardness in Shore D hardness of 20 to 60, preferably 30 to 55, more preferably 35 to 50. When the cover hardness is lower than 20, the rebound characteristics of the resulting golf ball are degraded. On the other hand, when the cover hardness is higher than 60, the spin mount at approach shot is too small, which degrades the controllability. The term "a cover hardness" as used herein refers to the hardness measured using a sample of a stack of the three or more heat and press molded sheets having a thickness of about 2 mm from the cover composition, which had been stored at 23° C. for 2 weeks.

The method of making the golf ball of the present invention will be explained in detail hereinafter. The method of making the golf ball of the present invention is roughly consisted of four steps of:

(a) forming the center 1,
(b) forming the core 4 having two-layered structure,
(c) covering the core with the cover 3, and
(d) after cooling, taking out the molded golf ball.

The steps (a) and (b) are explained in detail as described above. In the method of making the golf ball of the present invention, the step (c) is particularly a distinguishing feature. The step (c) is consisted of three steps of:

(i) molding the cover composition into a semi-spherical half-shell for the cover,
(ii) covering the core 4 with the two half-shell and placing it in a golf ball half mold having a semi-spherical cavity and many projections corresponding to the shape of the dimples in the cavity, and
(iii) covering the core 4 with the cover 3 by press molding under heating to mold a golf ball and simultaneously form a depression on the surface of the intermediate layer at the position corresponding to the dimple through the cover.

In the step (c-i), a semi-spherical half-shell is prepared from the cover composition. The method of preparing the half-shell is not limited, but may be methods of preparing a half-shell for the cover or intermediate layer of the conventional multi-piece solid golf ball, such as injection molding method, press molding method and the like. The thickness of the half-shell for the cover is within the range of (the desired cover thickness, $t_c$)±75%, preferably $t_c$±50%, more preferably $t_c$±25%. The thickness of the half-shell may be uniform or not uniform in the whole.

In the step (c-ii), the spherical core 4 obtained by forming the intermediate layer 2 on the center 1 is covered with the two half-shell, and it is placed in the cavity of the golf ball half mold. The golf ball mold is composed of an upper mold and a lower mold having a semi-spherical cavity, and the cavity has many projections corresponding to the shape of the dimples therein.

In the step (c-iii), it is desired to set a press temperature in the step of press molding under heating to the temperature of not less than (beginning flow temperature of the cover material $t_{fc}$−50° C.), preferably not less than ($t_{fc}$−30° C.). When the press temperature is lower than ($t_{fc}$−50° C.), the half-shell for the cover is not sufficiently deformed, and the dimple is not sufficiently formed. On the other hand, when the press temperature is too high, the flowability of the cover material is too high, and it is difficult to mold the half-shell. Therefore, it is desired to set the upper limit of the press temperature to the temperature of not more than (beginning flow temperature of the cover material $t_{fc}$+30° C.), preferably not more than ($t_{fc}$+10° C.). For example, since polyurethane-based thermoplastic elastomer "Elastollan XNY97A" as the cover material has a beginning flow temperature of 130° C., it is desired to set the press temperature to the range of 80 to 160° C.

Moreover, it is desired to set the press temperature to the temperature of not more than (beginning flow temperature of the intermediate layer material $t_{fi}$+50° C.), preferably not more than ($t_{fi}$+30° C.). When the press temperature is too high, the intermediate layer is squeezed out from the seam between the two half-shells, and the appearance and durability are degraded. On the other hand, when the press temperature is too low, the outermost layer of the intermediate layer, that is, the surface of the core is not sufficiently deformed, and the depression is not sufficiently formed. Therefore, it is desired to set the lower limit of the press temperature to the temperature of not less than (beginning flow temperature of the intermediate layer material $t_{fi}$−20° C.), preferably not less than ($t_{fi}$−10° C.). The "beginning flow temperature" as used herein is measured by using Shimadzu flowtester CFT-500, manufactured by Shimadzu Co., at the conditions described as follows.

Testing mode: Constant heating rate mode
Heating rate: 3° C./min
Plunger area: 1 cm$^2$
Die length: 1 mm
Die orifice diameter: 1 mm
Load: 588.399N (60 kgf)

The press time is not limited, but it is desired for a heating time to be 30 to 600 seconds, preferably 60 to 300 seconds. When the heating time is shorter than 30 seconds, the cover material is not sufficiently heated, and the half-shell for the cover is not sufficiently molded. On the other hand, when the heating time is longer than 600 seconds, the flowability of the cover material is too high. Moreover, it is desired to adjust the molding pressure to low pressure of 1 to 5 MPa under heated and to high pressure of 5 to 20 MPa during cooling. When the molding pressure is high under heated, the flowability of the cover material is too high, and it is problem in view of the molding, such as the off-center of the core. On the other hand, when the molding pressure is low during cooling, it is problem in view of the molding that molding defects such as sink mark occurs. Therefore, it is desired to set a press condition so as to flow a necessary and sufficient amount of the cover material.

Figure 2:
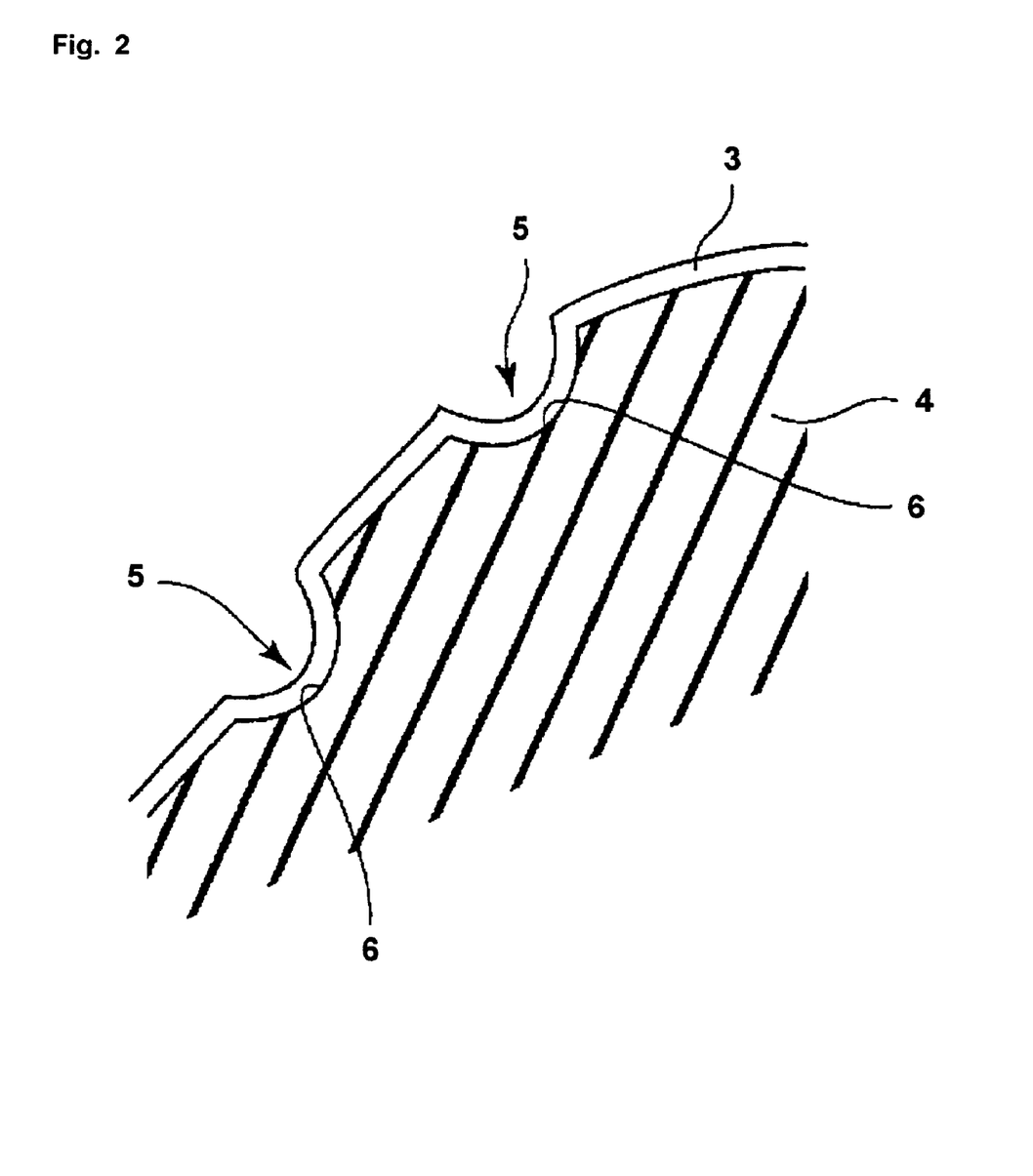
FIG. 2 is a enlarged cross section illustrating dimple portion of the golf ball of the present invention.

Moreover, in the step (c-iii), the dimples are formed on the surface of the golf ball by press molding under heating, and simultaneously the depressions are formed on the surface of the intermediate layer (that is, on the surface of the core) at the position corresponding to the dimple through the cover. Thereby it is possible to sufficiently maintain the cover thickness at the bottom portion of the dimple even if the cover thickness is small. If there is no depression on the surface of the intermediate layer, since the bottom portion of the dimple has a depth of 0.1 to 0.2 mm, the cover thickness is decreased by the depth, which degrades the durability. In addition, the intermediate layer shows through the cover, and the appearance is degraded. It is desired that the depression on the surface of the intermediate layer have a depth of 5 to 95%, preferably 10 to 90%, more preferably 15 to 80%, based on the depth of the corresponding dimple of the cover. When the depth of the depression on the surface of the intermediate layer is smaller than 5%, based on the depth of the corresponding dimple of the cover, the cover thickness at dimple bottom portion is too small, and the durability is degraded. On the other hand, when the depth is larger than 95%, the performance of the golf ball is not degraded, but it is very difficult to prepare the golf ball such that the depth is larger than 95% and to realize so. The value of the depth varies depending to the cover thickness, but it is desired for the value to be as large as possible within the range because of accomplishing uniform cover thickness in the whole.

The core is covered with the cover in the step (c), and then in the step (d), after cooling, a molded golf ball is taken out. Furthermore, in the golf ball of the present invention, paint finishing or marking with a stamp may be optionally provided for commercial purposes.

The golf ball of the present invention is formed to a diameter of 40 to 45 mm, particularly 42 to 44 mm. In order to reduce air resistance within the range according to the USGA (United States Golf Association) rule, the golf ball of the present invention is formed to a diameter of at least 42.67 mm (preferably 42.67 to 42.80 mm). In addition, the golf ball of the present invention is formed to a weight of 44 to 46 g, preferably 45.00 to 45.93 g.

EXAMPLES

The following Examples and Comparative Examples further illustrate the present invention in detail but are not to be construed to limit the scope of the present invention.

Production of Center

The rubber compositions for the center having the formulations A to E shown in Table 1 were mixed, and then vulcanized by press-molding at 170° C. for 15 minutes in a mold, which is composed of an upper mold and a lower mold and selected such that the center has the diameter shown in Table 1, to obtain spherical centers.

TABLE 1

| Center composition | (parts by weight) | | | | |
|---|---|---|---|---|---|
| | A | B | C | D | E |
| BR-18 *1 | 100.0 | 100.0 | 100.0 | 100.0 | 100.0 |
| Zinc acrylate | 35.0 | 35.0 | 35.0 | 35.0 | 35.0 |
| Zinc oxide | 5.0 | 5.0 | 5.0 | 5.0 | 5.0 |
| Dicumyl peroxide *2 | 0.5 | 0.5 | 0.5 | 0.5 | 0.5 |

TABLE 1-continued

| Center composition | (parts by weight) | | | | |
|---|---|---|---|---|---|
| | A | B | C | D | E |
| Diphenyl disulfide *3 | 0.8 | 0.8 | 0.8 | 0.8 | 0.8 |
| Barium sulfate | 13.4 | 8.0 | 16.5 | 12.0 | 12.4 |
| Center diameter (mm) | 38.5 | 41.1 | 37.3 | 39.1 | 38.9 |

*1: BR-18 (trade name), high-cis polybutadiene commercially available from JSR Co., Ltd.
*2: Dicumyl peroxide, commercially available from Nippon Oil & Fats Co., Ltd. under the trade name of "Percumyl D"
*3: Diphenyl disulfide, commercially available from Sumitomo Seika Co., Ltd.

(ii) Preparation of Intermediate Layer Composition

The formulation materials shown in Table 2 were mixed using a kneading type twin-screw extruder to obtain pelletized intermediate layer compositions. The extrusion condition was,
a screw diameter of 45 mm,
a screw speed of 200 rpm, and
a screw L/D of 35.

The formulation material was heated at 200 to 260° C. at the die position of the extruder. The beginning flow temperature of the resulting intermediate layer composition was 102° C.

TABLE 2

| Intermediate layer composition | Amount (parts by weight) |
|---|---|
| Hi-milan 1605 *4 | 50.0 |
| Hi-milan AM7329 *5 | 50.0 |

*4: Hi-milan 1605 (trade name), ethylene-methacrylic acid copolymer ionomer resin obtained by neutralizing with sodium ion, manufactured by Du Pont-Mitsui Polychemicals Co., Ltd.; Beginning flow temperature 103° C.
*5: Hi-milan AM7329 (trade name), ethylene-methacrylic acid copolymer ionomer resin obtained by neutralizing with zinc ion, manufactured by Du Pont-Mitsui Polychemicals Co., Ltd.; Beginning flow temperature 102° C.

(iii) Production of Core

The resulting intermediate layer composition prepared in the (ii) was directly injection molded on the center produced in the (i) to form a spherical two-layered core. The core mold was selected such that the core has the diameter shown in Table 5.

(iv) Preparation of Cover Composition

The formulation material shown in Table 3 was mixed using a kneading type twin-screw extruder to obtain pelletized cover composition. The extrusion condition was,
a screw diameter of 45 mm,
a screw speed of 200 rpm, and
a screw L/D of 35.

The formulation materials were heated at 200 to 260° C. at the die position of the extruder. The beginning flow temperature of the resulting cover composition was measured, and the result is shown in the same Table. The cover hardness was measured using a sample of a stack of the three or more heat and press molded sheets having a thickness of about 2 mm from the resulting cover composition, which had been stored at 23° C. for 2 weeks, with a Shore D hardness meter according to ASTM D 2240. The result is shown in the same Table.

TABLE 3

| Cover composition | Amount (parts by weight) |
|---|---|
| Elastollan XNY97A *6 | 100 |
| Titanium dioxide | 4 |
| Beginning flow temperature (° C.) | 130 |
| Hardness (Shore D) | 57 |

*6: Elastollan XNY97A (trade name), polyurethane-based thermoplastic elastomer formed by using 4,4'-dicyclohexylmethane diisocyanate ($H_{12}MDI$), commercially available from BASF Japan Ltd.; Beginning flow temperature 130° C., Shore A (JIS-A) hardness = 97

Examples 1 to 4 and Comparative Examples 1 to 2

The cover composition prepared in the (iv) was injection molded to obtain semi-spherical half-shell for the cover having the same thickness as the cover thickness (in land portion having no dimple) shown in Table 5. The core produced in the (iii) was covered with the two semi-spherical half-shells for the cover and then press-molded in the mold at the molding condition shown in Table 4 to form a cover layer on the core. Then, clear paint was coated on the surface of the cover layer after deflashing and surface pretreatment for painting to obtain a golf ball having a diameter of 42.7 mm.

TABLE 4

| | Condition | 1 | 2 | 3 | 4 | 5 |
|---|---|---|---|---|---|---|
| Stage 1 | Temp. (° C.) | 70 | 100 | 130 | 170 | 150 |
| | Pressure (MPa) | 3 | 3 | 3 | 3 | 3 |
| | Time (sec) | 180 | 180 | 180 | 180 | 180 |
| Stage 2 | Temp. (° C.) | 0 | 0 | 0 | 0 | 0 |
| | Pressure (MPa) | 3 | 3 | 3 | 3 | 3 |
| | Time (sec) | 30 | 30 | 30 | 30 | 30 |
| Stage 3 | Temp. (° C.) | 0 | 0 | 0 | 0 | 0 |
| | Pressure (MPa) | 10 | 10 | 10 | 10 | 10 |
| | Time (sec) | 300 | 300 | 300 | 300 | 300 |

In the molding condition shown in Table 4, in the Condition 1, the temperature at the Stage 1 was too low, and the cover material did not deform. Therefore, the golf ball could not be molded. In the Condition 4, the temperature at the Stage 1 was too high, and the flowability of the cover material was too high, and sink mark occurred. Therefore, the golf ball could not be molded. In the conditions 2, 3 and 5, the golf ball could be molded, and the appearance of the molding article was good. In the Examples, the coefficient of restitution, flight performance and durability of the resulting golf ball molded at the Condition 3 were measured or evaluated. The results are shown in Table 5. The test methods are as follows.

Test Methods (1) Coefficient of Restitution

A cylindrical aluminum projectile having a weight of 200 g was struck at a speed of 45 m/sec against a golf ball, and the velocity of the projectile and the golf ball after the strike was measured. The coefficient of restitution of the golf ball was calculated from the velocity and the weight of both the projectile and the golf ball before and after the strike. The measurement was conducted 5 times for each golf ball (n=5), with the mean value being taken as the coefficient of restitution of each ball and expressed as an index, with the value of the index in Comparative Example 1 being taken as 100. A higher index corresponded to a higher rebound characteristic, and thus a good result.

(2) Flight Performance

After a commercially available No. 1 wood club having metal head was mounted to a swing robot manufactured by True Temper Co. and the resulting golf ball was hit at a head speed of 45 m/sec, the flight distance was measured. As the flight distance, total that is a distance to the stop point of the hit golf ball was measured. The measurement was conducted 5 times for each golf ball (n=5), and the average is shown as the result of the golf ball.

(3) Durability

After a No. 1 wood club (a driver, W#1) having metal head was mounted to a swing robot manufactured by True Temper Co., a golf ball was hit at a head speed of 45 m/sec to strike against an impact board, repeatedly. The durability is evaluated by measuring the number of strike until the cover of the golf ball cracks. The evaluation criteria are as follows.

Evaluation Criteria o: The cover of the golf ball cracked at the number of strike of not less than 100.

Δ: The cover of the golf ball cracked at the number of strike of not less than 70 and less than 100.

x: The cover of the golf ball cracked at the number of strike of less than 70.

(Test Results)

TABLE 5

| | Example No. | | | | Comparative Example No. | |
|---|---|---|---|---|---|---|
| | 1 | 2 | 3 | 4 | 1 | 2 |
| (Center) | | | | | | |
| Composition | A | A | A | C | A | B |
| Diameter (mm) | 38.5 | 38.5 | 38.5 | 37.3 | 38.5 | 41.1 |
| (Intermediate layer) | | | | | | |
| Thickness (mm) | 1.9 | 1.6 | 1.3 | 2.2 | 1.0 | 0.3 |
| (Core) | | | | | | |
| Diameter (mm) | 42.3 | 41.7 | 41.1 | 41.7 | 40.5 | 41.7 |

TABLE 5-continued

|  | Example No. | | | | Comparative Example No. | |
| --- | --- | --- | --- | --- | --- | --- |
|  | 1 | 2 | 3 | 4 | 1 | 2 |
| (Cover) Cover thickness (mm) | | | | | | |
| Land portion (a) | 0.20 | 0.50 | 0.80 | 0.50 | 1.10 | 0.50 |
| Dimple portion (b) | 0.14 | 0.39 | 0.65 | 0.38 | 0.92 | 0.38 |
| Difference (a − b) | 0.06 | 0.11 | 0.15 | 0.12 | 0.18 | 0.12 |
| Depression depth A (mm) | 0.12 | 0.07 | 0.03 | 0.06 | 0 | 0.06 |
| Dimple depth B (mm) | 0.18 | 0.18 | 0.18 | 0.18 | 0.18 | 0.18 |
| A/B (%) | 67 | 39 | 17 | 33 | 0 | 33 |
| (Golf ball) | | | | | | |
| Coefficient of restitution | 106 | 104 | 103 | 101 | 100 | 105 |
| Flight distance (m) | 217 | 216 | 214 | 212 | 209 | 216 |
| Durability | ○ | ○ | ○ | ○ | ○ | x |

As is apparent from the results of Table 5, in the golf balls of the present invention of Examples 1 to 4, when compared with the golf balls of Comparative Examples 1 to 2, the coefficient of restitution, flight distance and durability are excellent.

On the other hand, in the golf ball of Comparative Example 1, the intermediate layer has no depression, but the cover thickness is large. Therefore, the durability is excellent, but the coefficient of restitution is low, which reduces the flight distance too much. In the golf ball of Comparative Example 2, the intermediate layer has depressions, and the coefficient of restitution and flight distance are excellent. However, the intermediate layer thickness is small, and the durability is very poor.

What is claimed is:

1. A golf ball comprising a core having a center and at least one intermediate layer formed on the center, and a cover covering the core, and having many dimples on the surface thereof prior to the application of a finish coating to the surface of the cover, wherein an outermost layer of the intermediate layer is formed from thermoplastic resin, has a thickness of 0.5 to 3.0 mm, and has depressions in the surface thereof at positions and having shapes corresponding to the dimples through the cover, and the cover is formed from thermoplastic resin and has (1) a thickness of 0.1 to 0.8 mm in land portion having no dimple and (2) a thickness at the bottom of each dimple that differs from the thickness in land portions by no more than 0.2 mm.

2. The golf ball according to claim 1, wherein the depressions in the surface of the outermost layer of the intermediate layer have a depth of 5 to 95%, based on the depth of the dimples.

3. The golf ball according to claim 1, wherein the cover has a thickness of 0.2 to 0.6 mm in land portion having no dimple, and the outermost layer of the intermediate layer has a thickness of 0.5 to 2.0 mm.

4. A method of making a golf ball comprising a core having a center and at least one intermediate layer formed on the center, and a cover covering the core, and having many dimples on the surface thereof, the method comprising the steps of:

(a) forming a spherical center, (b) forming an intermediate layer on the center by using two core half molds having a semi-spherical cavity to form a spherical core, (c) (i) molding a cover composition into a semi-spherical half-shell for the cover, (ii) covering the core with two of the half-shells and placing the covered core in a golf ball half mold having a semi-spherical cavity and many projections corresponding to the shape of the dimples in the cavity, (iii) press molding the covered core under heating to mold a golf ball with a cover having (1) a thickness of 0.1 to 0.8 mm in land portion having no dimple and (2) a thickness at the bottom of each dimple that differs from the thickness in land portions by no more than 0.2 mm and simultaneously form depressions in the surface of the intermediate layer at positions corresponding to the dimples through the cover, and (d) after cooling, opening the mold to take out a molded golf ball.

5. The golf ball prepared by the method according to claim 4, wherein the dimples are formed in the surface of the cover prior to the application of a finish coating to the surface of the cover, an outermost layer of the intermediate layer is formed from thermoplastic resin, has a thickness of 0.5 to 3.0 mm, and has depressions in the surface thereof at positions and having shapes corresponding to the dimples through the cover, and the cover is formed from thermoplastic resin and has a thickness of 0.1 to 0.8 mm in land portion having no dimple.

6. The golf ball according to claim 5, wherein the depressions in the surface of the outermost layer of the intermediate layer have a depth of 5 to 95%, based on the depth of the dimples.

7. The golf ball according to claim 5, wherein the cover has a thickness of 0.2 to 0.6 mm in land portion having no dimple, and the outermost layer of the intermediate layer has a thickness of 0.5 to 2.0 mm.

8. A golf ball comprising a core having a center and at least one intermediate layer formed on the center, and a cover confronting and covering the core, and having many dimples on the surface thereof prior to the application of a finish coating to the surface of the cover and formations, corresponding to the dimples, protruding from the surface of the cover that confronts the core, wherein an outermost layer of the intermediate layer is formed from thermoplastic resin, has a thickness of 0.5 to 3.0 mm, and has depressions in the surface thereof that accommodate the formations, each of the depressions underlying a dimple at a position aligned with the dimple and having a shape corresponding to the dimple, and the cover is formed from thermoplastic resin and has a thickness of 0.1 to 0.8 mm in land portion having no dimple.

9. The golf ball according to claim 8, wherein the depressions in the surface of the outermost layer of the intermediate layer have a depth of 5 to 95%, based on the depth of the dimples.

10. The golf ball according to claim 8, wherein the cover has a thickness of 0.2 to 0.6 mm in land portion having no dimple, and the outermost layer of the intermediate layer has a thickness of 0.5 to 2.0 mm.

* * * * *